United States Patent Office 3,732,234
Patented May 8, 1973

3,732,234
(THIO-, SULFINYL- AND SULFONYL) CONTAINING PYRIDINE COMPOUNDS
Penelope B. Domenico, Danville, Calif., assignor to The Dow Chemical Company, Midland, Mich.
No Drawing. Original application Sept. 26, 1969, Ser. No. 861,506, now Patent No. 3,639,413, dated Feb. 1, 1972. Divided and this application May 17, 1971, Ser. No. 144,331
Int. Cl. C07d 21/48, 31/50
U.S. Cl. 260—294.8 F                  7 Claims

ABSTRACT OF THE DISCLOSURE

The present disclosure is directed to (thio-, sulfinyl- and sulfonyl) containing pyridine compounds corresponding to the formula

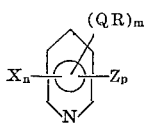

wherein R represents hydrogen, alkyl monohaloloweralkyl, alkenyl, monohaloalkenyl, cycloalkyl, monohalocycloalkyl, phenyl, aralkyl, alkaryl or monohalophenyl; Q represents sulfide (—S—), sulfinyl

each X independently represents chlorine, bromine or fluorine; Z represents one of cyano (—CN), carbamoyl (—CONH$_2$) of carboxy (—COOH) or the salts thereof; $n$ represents an integer of 0 to 3, inclusive; $m$ represents an integer of 1 to 3, inclusive; $p$ represents an integer of 1 or 2 and the sum of $n+m+p$ equals an integer of 2 to 5, inclusive, with the proviso that when Q is other than sulfide (—S—), R is other than hydrogen and when R is H, $m$ is not greater than 2. The preparation of these compounds and their utility as pesticides is also taught.

CROSS REFERENCE TO RELATED APPLICATION

This application is a division of my co-pending application Ser. No. 861,506, filed Sept. 26, 1969, now U.S. Pat. 3,639,413.

SUMMARY OF THE INVENTION

The present invention is directed to (thio-, sulfinyl- and sulfonyl) containing pyridine compounds corresponding to the formula

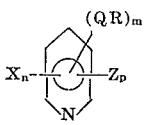

In this and succeeding formula, R represents hydrogen, alkyl, monohaloloweralkyl, alkenyl, monohaloalkenyl, cycloalkyl, monohalocycloalkyl, phenyl, aralkyl, alkaryl or monohalophenyl; Q represents sulfide (—S—), sulfinyl

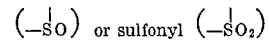

each X independently represents chlorine, bromine or fluorine; Z represents one of cyano (—CN), carbamoyl (—CONH$_2$) or carboxy (—COOH) or the salts thereof; $n$ represents an integer of 0 to 3, inclusive; $m$ represents an integer of 1 to 0.3, inclusive; $p$ represents an integer of 1 or 2 and the sum of $n+m+p$ equals an integer of 2 to 5, inclusive, with the proviso that when Q is other than sulfide (—S—). R is other than hydrogen, and when R is H, $m$ is not greater than 2.

Within the class of compounds described above, a preferred group of compounds exhibiting outstanding characteristics such as high pesticidal activity, includes those selected from those compounds corresponding to the formula

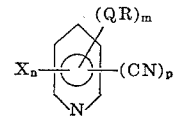

wherein X, Q, R, $n$, $m$ and $p$ have the meanings given above.

The term "alkyl" as employed in the present specification and claims designates a straight or branched chain alkyl radical containing from 1 to 12 carbon atoms, inclusive, such as, for example, dodecyl, octyl, heptyl, hexyl, sec-hexyl, butyl, decyl, 4-methyldecyl, undecyl, nonyl, isobutyl, tert-butyl, isoamyl, amyl, propyl, ethyl, isopropyl, 3-ethylnonyl, 2-ethylhexyl, and 3-propylheptyl. The term "cycloalkyl" as employed designates a cycloalkyl radical containing from 3 to 6 carbon atoms, such as, for example, cyclopropyl, cyclobutyl, cyclopentyl and cyclohexyl.

The expression "loweralkyl" is employed in the present specification and claims to designate a straight or branched chain alkyl radical containing from 1 to 5 carbon atoms, inclusive, such as, for example, methyl, ethyl, isopropyl, propyl, 1,1-dimethyl propyl, tert-butyl, butyl, amyl, sec-amyl, etc.

The term "alkenyl" as employed in the present specification and claims designates an alkenyl radical containing from 2 to 12 carbon atoms, inclusive, such as, for example, vinyl, propenyl, 2-methyl propenyl, butenyl, hexenyl, decenyl and dodecenyl.

The term "halogen" and "halo" are employed herein to represent chlorine, fluorine and bromine.

The term "alkaryl" as employed in the present specification and claims designates an alkaryl radical of 7 to 9 carbon atoms, inclusicve, such as, for example, tolyl, xylyl, ethyl phenyl or propyl phenyl.

The term "salt" as employed in the present specification and claims designates an aralkyl radical of 7 to 9 carbon atoms, inclusive, such as, for example, benzyl, phenethyl and phenyl propyl.

The term "salt" as employed in the present specifica tion and claims designates the reaction products of basic compounds with the acid functional group —COOH. Such salts can be represented by the formula —COOMe wherein Me represents ammonium, the alkali metals such as sodium, lithium, potassium, cesium or rubidium, the alkaline earth metals such as calcium, barium and strontium and the heavy metals including antimony, zinc, bismuth, cadmium, cerium, chromium, cobalt, copper and other metals having a density of above 4.

For convenience, those compounds of the present invention wherein Q represents the sulfide group (—S—) and R is hydrogen are identified as mercaptopyridines and those wherein Q is (—S—) and R is other than hydrogen are identified as substituted thiopyridines; those compounds wherein Q represents the sulfinyl group

are identified as sulfinylpyridines and those compounds wherein Q represents the sulfonyl group

are identified as sulfonylpyridines.

The pyridines of the present invention are crystalline solids or oils which are of low solubility in water and of moderate solubility in common organic solvents. These compounds have low phytotoxity and are suitable for use as pesticides in the control of various pests including insects and bacteria. These compounds also have low acute oral toxicity for mammals.

The compounds of the present invention are prepared by a variety of methods. The mercaptopyridines, i.e., when QR is —SH and Z is either cyano, carboxy or carbamoyl can be prepared by the reaction of sodium sulfide with an appropriate halocyanopyridine, halocarboxypyridine or halocarbamoylpyridine in the presence of an inert solvent, followed by acidifying the reaction product. These reactions can be represented as follows:

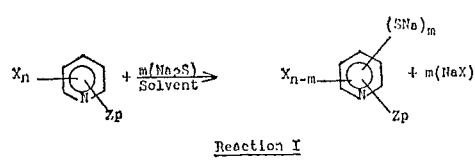

Reaction I

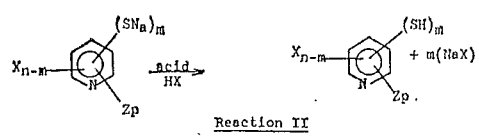

Reaction II

Reaction I proceeds readily under ambient atmospheric pressure at temperatures of from about minus 50 to about 100° C. The two reactants are intimately contacted in an inert solvent such as methanol, isopropanol, triethylamine, dimethoxyethane or the like. The reaction consumes the reactants in a ratio of 1 or 2 moles of the sodium sulfide per mole of the halopyridine, depending upon whether the mono- or bismercaptopyridine is the desired product. It is preferred, however, that a slight excess of the sodium sulfide be employed.

The reactants are usually mixed at a low temperature, such as about minus 20° C. and the heat of reaction is allowed to raise the temperature of the reactants (with control) to between about 20° C. and the refluxing temperature of the mixture. Depending on the rate of reaction, the reaction mixture may be refluxed for a period of time up to about one hour. With some reactants, the rate of reaction is so rapid as to need no refluxing. The reaction time depends on the reactants employed and is usually between about one minute and about one hour. The solvent is ordinarily removed from the reaction mixture by vacuum distillation and the residue (the sodium mercapto salt) is mixed with water and acidified with a concentrated mineral acid, such as hydrochloric acid, to convert the sodium salt to the corresponding —SH compound. The reaction product is removed by conventional liquid-solid separatory techniques, e.g. filtration, decantation, centrifugation and the like. The reaction product is added to a solvent or solvent mixture such as benzene or benzene/hexane, the solution dried and the product crystallized therefrom. The so dried and crystallized product can be employed as such or further purified by recrystallization from an inert organic solvent such as benzene, hexane or the like.

The thiopyridines wherein Z is either cyano, carboxy or carbamoyl and R is an unhalogenated hydrocarbyl group, can be prepared by employing an appropriate sodium mercaptopyridine as a starting material. This latter compound in its preparative mixture, or after separation therefrom, is mixed with an inert organic solvent and contacted with an alkyl- or alkenyliodide or other reactive alkyl- or alkenylhalide and the mixture refluxed to prepare the final product. This reaction can be represented as follows:

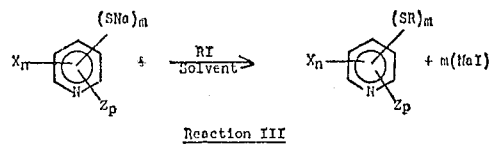

Reaction III

The reaction proceeds readily under ambient atmospheric pressure at temperatures of from about minus 10° to about 85° C. The reactants are intimately contacted in one of the inert solvents disclosed hereinbefore in the ratio of about 1 or 2 moles of the halide per mole of sodium mercaptopyridine depending on the number of —SNa groups to be reacted to form the desired product. The reactants are usually mixed at a low temperature which may be as low as minus 20° C. and by controlling the heat of reaction, the temperature of the reactants is raised to between 20° C. and the reflux temperature of the mixture. Depending on the rate of reaction, the reaction mixture may be refluxed for a period of time up to about four hours. With some reactants, the rate of reaction is so rapid as to need no refluxing. The required reaction time is usually between about one minute and about four hours. The reaction mixture is allowed to cool, diluted with water and the resulting precipitate filtered out, dried and crystallized in a conventional manner.

An alternative procedure for preparing the above alkyl thiopyridines involves the direct reaction of a polyhalopyridine, sodium metal and the appropriate mercaptan in the presence of an organic solvent of a type conventionally used for such reactions. This reaction can be represented as follows:

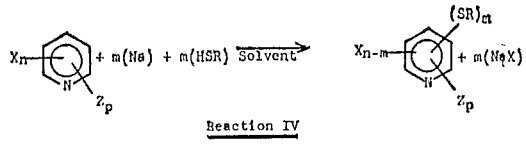

Reaction IV

The reaction is carried out by dissolving the sodium metal in a cold organic solvent such as methanol. The mercaptan is added to this cold solution, with stirring, and the resulting mixture is slowly added to the halopyridine also dissolved in methanol. This mixture is refluxed for a time sufficient to complete the reaction, usually from about one to about three hours. The reaction products are filtered to remove any sodium halide, followed by solvent removal by evaporation, distillation or other conventional separatory procedures. The residue is conveniently taken up in a warm solvent mixture, i.e. a benzene-hexane mixture, to remove any remaining sodium halide and then cooled to recrystallize the product, which may be separated by a conventional separatory procedure. Again, as in the above described preparation procedures, the reaction consumes the reactants in a ratio of about 1 or 2 molecular or atomic proportions of the mercaptan and sodium metal per mole of halopyridine, depending on whether the mono-, or bisthiohalopyridine is the desired product and the use of these ratios is preferred. The reaction conditions are also the same as hereinbefore set forth.

In an alternative procedure for preparing monohaloloweralkyl- and monohalocycloalkyl thiopyridines, a monomercaptohalopyridine is reacted with a halogen (chlorine or bromine) in carbon tetrachloride to convert the mercaptohalopyridine to the corresponding sulfenyl halide (—SX) which is in turn adducted with the alkenyl group of an alkene or cycloalkene to form the final alpha halosulfide product. Representative examples of such unsaturated compounds include ethylene, propylene, n-butylene, isobutylene, amylene, and cyclohexene. These reactions can be represented or exemplified as follows:

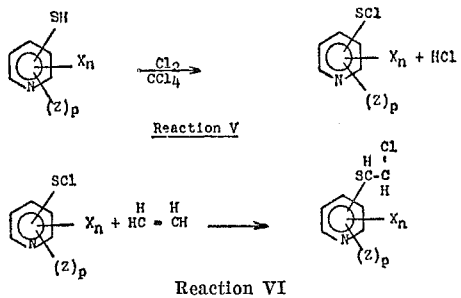

Reaction V

Reaction VI

The reaction conditions and times are generally the same as for the hereinbefore described procedures. The reaction consumes the reactants in a ratio of 1 mole of the unsaturated compound per mole of the halopyridyl sulfenyl halide.

When the bis- or tris(haloloweralkyl- or halocycloalkylthio)pyridine is the desired product, each additional haloloweralkyl or halocycloalkyl- thio group must be added separately. In such a procedure, the above monothiohalopyridine product is reacted with sodium sulfide following the procedures of Reactions I and II to prepare a product containing an additional mercapto group. The product is reacted with a halogen (following the procedure of Reaction V) to convert the mercapto group to the sulfenyl halide which may then be adducted with an additional alkene or cycloalkene (following the procedures of Reaction VI) to prepare the bis- (haloloweralkylthio)- or (halocycloalkylthio)pyridine. The above steps are repeated when the tris compound is the desired product. The alkene or cycloalkene compound employed in a second or third aduction step does not have to be the same as that employed in a prior adduction step.

The ammonia, alkali metal, alkaline earth metal and heavy metals salts of the present invention are prepared by conventional technique whereby the carboxyl group of a carboxy substituted alkyl nitrile is reacted with a hydroxide, oxide, carbonate or bicarbonate of one of the above grouped metals. They can in some cases also be made by direct reaction with the metals.

The mono-, bis- or trissulfinyl- and sulfonyl-halopyridine counterparts of the present invention are prepared by reacting the appropriate mono-, bis-, or tristhiohalopyridine with an oxidizing agent. The oxidation of any of the thiohalopyridines of this invention results, at least partially, in the formation of the corresponding sulfinyl- halopyridine compound.

The oxidation of one molecular of the thiohalopyridine to the corresponding sulfinylhalopyridine or the oxiadtion of one molecule of a sulfinylhalopyridine to the corresponding sulfonylhalopyridine requires one atom of oxygen for each sulfur atom oxidized. The oxidation of the thiohalopyridines directly to the corresponding sulfonylhalopyridine, on the other hand, consumes two atoms of oxygen for each sulfur atom in each molecule of thiohalopyridine so oxidized.

In carrying out the various oxidation reactions to prepare the sulfonyl compounds of the present invention, it is preferable to employ an excess of the oxidizing agent, whereas in preparing the sulfinyl compounds, it is preferable not to provide oxygen appreciably in excess of the stoichiometric quantities consumed in the conversion and to employ milder reaction conditions and/or oxidants.

In many instances, the sulfinylpyridine can be prepared and subjected to continuing oxidative conditions so as to be further oxidized in situ to the corresponding sulfonyl- halopyridine compound. In some instances, depending on the oxidizing agent and process conditions, the oxidation proceeds to the sulfonylhalopyridine so rapidly that it is not practical to isolate the sulfinyl compound. Representative oxidizing agents for the production of the sulfinylhalopyridine compounds include nitric acid and hydrogen peroxide and representative oxidizing agents to be employed in the preparation of the sulfonyl compounds include hydrogen peroxide, and perbenzoic acid.

Hydrogen peroxide, and conveniently an aqueous solution thereof, can be employed as the oxidizing agent in the production of the sulfinyl and sulfonyl pyridine derivatives of the present invention. In such embodiment, the reaction is carried out in the presence of a liquid reaction medium, such as trifluoroacetic acid, glacial acetic acid or a mixture of acetic acid and acetic anhydride. In a preferred procedure, the acid-anhydride mixture is employed as the liquid reaction medium. The reaction takes place at temperatures of from about 75° to about 120° C. In a convenient method, the reaction is carried out at the boiling temperature of the reaction mixture and under reflux. In carrying out the reaction, the reactants are contracted in any order or fashion, and preferably in amounts stoichiometric for the preparation of the desired product. The reaction mixture is then maintained at a temperature within the reaction temperature range until the desired degree of conversion is achieved. Following the reaction period, the mono-, bis- or trissulfonylpyridine product can be separated by conventional procedures such as evaporation of the reaction medium to obtain the product as a solid residue. In an alternative procedure, the reaction mixture is washed with cold water and is thereafter filtered, centrifuged or the like to obtain the crystalline product.

Nitric acid is conveniently employed to oxidize the mono-, bis- or tristhiopyridine starting materials to the corresponding mono-, bis- or trissulfinylpyridines. The reaction can be carried out in the presence of a halocarbon reaction medium such as carbon tetrachloride, methylene dichloride, ethylene dibromide, etc. In a preferred procedure, excess nitric acid is employed as the reaction medium. The reaction proceeds at temperatures between about 15° C. and about 120° C. Preferably the reaction is carried out under reflux conditions at temperatures of from 80° C. to 120° C. and requires only a short period of time for completion, i.e., about 2 to about 7 minutes. Conveniently, the reactants are mixed and the temperature is allowed to rise to the desired temperature and maintained at or about this temperature during the refluxing.

The contacting of the reagents and separation and isolation of the desired product are all as previously described.

In an additional procedure, chlorine water can also be employed as the oxidizing agent in the preparation of mono-, bis- or trissulfinyl- or sulfonyl pyridines from the corresponding thio pyridine or sulfinyl pyridines. However, the cyano groups in the compounds of this invention are generally readily hydrolyzed and usually this oxidizing agent should not be employed unless the carboxy or carbamoyl hydrolysis product of the cyano group is also desired. When employing chlorine water as an oxidizing agent, a slurry of the sulfide compound to be oxidized is prepared in water and the slurry agitated while chlorine gas is bubbled in. The mixture is maintained at room temperature until no starting sulfide material is left unoxidized. If it is desired to convert the sulfinyl compound to the sulfonyl state, the temperature is raised to about 90° C. and the mixture maintained at this temperature until oxidation is complete. This mode of oxidation is further discussed in U.S. Pat. 3,415,832.

The monohaloalkenylthio pyridines can be prepared by adducting a sulfenylhalide as hereinbefore prepared (Reaction V) with an acetylenic compound under the conditions set forth for Reaction VI. Representative acetylenic compounds include, for example, acetylene, ethyl acetylene, n-propylacetylene, 1-hexyne, n-amyl acetylene, 5-methyl - 1 - hexyne, 1-octyne, di-n-propylacetylene, di-t-butylacetylene.

The oxidation of the halosulfide product to the sulfinyl or sulfonyl product is quite difficult and these compounds can be prepared by conventional dehydrohalogenation of a dihalosulfinyl- or sulfonylpyridine with an organic base such as, for example, trimethylamine. Dihalosulfinyl- or sulfonyl compounds having utilities of the types taught herein are prepared by adducting a sulfenyl halide with a monohaloalkenyl compound employing the conditions of Reaction VI. Representative of such monohaloalkenes include, for example, allyl bromide, allyl iodide, 5-bromo-2-pentene, 4-bromo-1-butene, 4-bromo-1-hexene, 1-chloro-4 - octene, 7 - bromo-1-decene and 4-bromo-3-methyl-2-butene.

DESCRIPTION OF SOME PREFERRED EMBODIMENTS

The following examples illustrate the present invention and the manner by which it can be practiced but, as such, should not be construed as limitations upon the overall scope of the same.

EXAMPLE 1

3,5,6-trichloro-4-mercapto-2-cyanopyridine

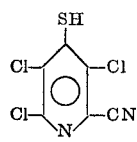

A solution is prepared containing 20 grams (0.08 mole) of tetrachloro - 2 - cyanopyridine and 200 milliliters of isopropanol which is added very quickly to an agitated solution of 21.86 grams (0.09 mole) of sodium sulfide nonahydrate in 200 milliliters of isopropanol at 70° C. and the mixture refluxed for one hour at 82° C. The isopropanol is stripped off under vacuum and the residue is diluted with water and acidified with 11.89 grams of concentrated hydrochloric acid. A precipitate of 3,5,6-trichloro-4-mercapto - 2 - cyanopyridine product is formed recovered by filtration, dried in a benzene solution with anhydrous sodium sulfate and recrystallized from hexane. The product is recovered in a yield of 92.5 percent of theoretical and has a melting point of 128°–130° C. The product is found by analysis to have carbon, hydrogen, chlorine, nitrogen and sulfur contents of 31.49, 0.73, 42.58, 11.81 and 12.98 percent, respectively, as compared to the theoretical contents of 31.30, 0.46, 43.60, 11.51 and 13.13 percent, respectively, calculated for the named structure.

EXAMPLE 2

2,5,6-trichloro-4-mercapto-3-cyanopyridine

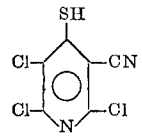

A solution is prepared containing 50 grams (0.21 mole) sodium sulfide nonahydrate dissolved in 150 milliliters of water and this solution is quickly poured into a solution of 50 grams (0.21 mole) of tetrachloro-3-cyanopyridine in about 300 milliliters of dimethoxy ethane at about minus 20° C. The reaction mixture becomes a clear dark red color and the temperature is maintained at minus 10° C. The solution is cooled and acidified with concentrated hydrochloric acid until precipitation ceases. The 2,5,6-trichloro-4-mercapto-3-cyanopyridine product is recovered by filtration and dried in a benzene solution. The solution is diluted with hexane and the product is recovered by recrystallization from this solution. The product is obtained in a yield of 52.4 percent of theoretical, melts at 136° C. and is found by analysis to have carbon, hydrogen, chlorine, nitrogen and sulfur contents of 30.33, 0.75, 43.91, 11.85 and 13.16 percent, respectively, as compared with the theoretical contents of 30.08, 0.42, 44.40, 11.72 and 13.38 percent, respectively, calculated for the named structure.

EXAMPLE 3

3,5-dichloro-4-mercapto-2,6-dicyanopyridine and 4,5-dichloro-3-mercapto-2,6-dicyanopyridine

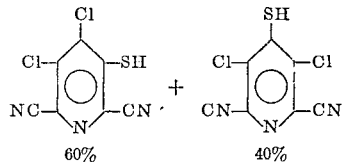

A solution is prepared by dissolving 9.0 grams (0.39 mole) of 3,4,5-trichloro-2,6-dicyanopyridine in 75 milliliters of dimethoxyethane and this solution is quickly added, with stirring, to a cold (minus 10° C.) solution of sodium sulfide nonahydrate (9.32 grams, 0.39 mole) dissolved in 70 milliliters of water. The temperature is maintained between 0° and 25° C. The reaction mixture is stirred for 20 minutes and the solids formed are filtered off. The remaining liquid is acidified with concentrated hydrochloric acid until acidic to pH paper and the resulting product as a precipitate is recovered by filtration. The product is subsequently analyzed by Nuclear Magnetic Resonance Techniques and determined to be about 40 mole percent 3,5-dichloro-4-mercapto-2,6- dicyanopyridine and 60 mole percent 4,5-dichloro-3-mercapto-2,6-dicyanopyridine. The product is found by further analysis to have carbon, hydrogen, chlorine, nitrogen and sulfur contents of 37.70, 0.50, 28.60, 18.80 and 13.44 percent, respectively, as compared with the theoretical contents of 36.50, 0.44, 30.80, 18.24 and 13.90 percent, respectively, calculated for either of the named structures. The individual isomers are recoverable by conventional procedures such as, for example, preparative vapor phase chromatography, fractional crystallization and the like.

EXAMPLE 4

3,6-dichloro-5-(mthylthio)-2,4-dicyanopyridine

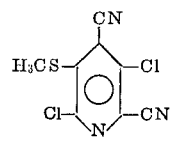

A solution is prepared by dissolving 4.6 grams of trichloro-2,4-dicyanopyridine dissolved in 10 milliliters of dimethoxyethane at 50° C. and to this is added a solution containing 4.8 grams of sodium sulfide dissolved in 10 milliliters of water. The temperature is allowed to rise to 65° C. and the reaction mixture is held at this temperature for 10 minutes and cooled to about 10° C. To this reaction mixture is added a solution containing 2.9 grams (0.02 mole) of methyl iodide dissolved in 100 milliliters of dimethoxyethane and the reaction mixture is refluxed for 30 minutes and quenched in ice water. The 3,6-dichloro-5-methylthio-2,4-dicyanopyridine product is recovered by filtration and consecutively recrystallized from pentane, hexane and methyl cyclohexane. The so purified product is found to have a melting point of 104°–106° C.

EXAMPLE 5

3,4,5-tris(methylthio)-2,6-dicyanopyridine

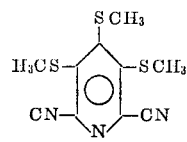

A solution is prepared by dissolving 0.36 grams (0.02 mole) of sodium chips in 30 milliliters of methanol and cooling to a temperature of 25° C. To this solution is added over a period of 15 minutes, cold methylmercaptan in an amount of 0.82 gram (0.02 mole). The resulting mixture is added slowly to a refluxing suspension of 3,4,5-trichloro - 2,6 - dicyanopyridine (3.65 grams, 0.02 mole) in 25 milliliters of methanol. The reaction mixture is refluxed for three hours, filtered to remove sodium chloride formed and cooled to precipitate the 3,4,5-tris-(methylthio)-2,6-dicyanopyridine product. The product is recovered by filtration and recrysatllized from benzene. The product has a molecular weight of 267 and the structure is confirmed by nuclear magnetic resonance analysis.

EXAMPLE 6

3,5,6-trifluoro-4-(methylthio)-2-cyanopyridine

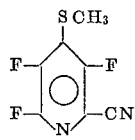

Into a 250 milliliter flask containing 30 grams (0.17 mole) of tetrafluoro-2-cyanopyridine maintained at minus 10° C. in a Dry Ice bath, is added 9.0 grams (0.19 mole) of methylmercaptan, with stirring. Triethylamine (17.2 grams, 0.17 mole) is added dropwise while the temperature is held at about minus 10° C. The reaction mixture is held at ice bath temperature for one hour and allowed to come to ambient room temperature and held at this temperature for about 12 hours. The reaction mixture is washed with water and the insoluble residue taken up with methylene dichloride. The solution is dried with sodium sulfate, filtered and the methylene dichloride distilled away leaving the 3,5,6-trifluoro-4-(methylthio)-2-cyanopyridine product. This product, a yellow liquid, has a boiling point at 38 milliliters of mercury of 138°–140° C., is recovered in a yield of 73 percent of theoretical and is found by analysis to have carbon, hydrogen, fluorine, sulfur and nitrogen contents of 41.15, 1.41, 27.80, 15.61 and 13.58 percent, respectively, as compared with the theoretical contents of 41.18, 1.48, 27.92, 15.70 and 13.72 percent, respectively, calculated for the named structure.

EXAMPLE 7

3,5,6-trichloro-4-[(o-chlorocyclohexyl)thio]-2-cyanopyridine

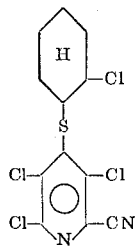

To a 450 milliliter solution of carbon tetrachloride saturated with chlorine (Cl₂) is added with stirring, 20 grams (0.08 mole) of 3,5,6-trichloro-4-mercapto-2-cyanopyridine (prepared as per Example 1). During this step, the mercapto group in the 3,5,6-trichloro-4-mercapto-2-cyanopyridine is converted to sulfenyl chloride group. To this reaction mixture is added 6.86 grams (0.08 mole) of cyclohexene and the mixture stirred for 15 minutes at ambient room temperature and filtered to remove any insoluble material. The carbon tetrachloride is removed and the solid 3,5,6 - trichloro - 4-[(o-chlorocyclohexyl)thio]-2-cyanopyridine product remaining is recrystallised from hexane, filtered and freed of solvent. The product is recovered in a yield of 52.4 percent, has a melting point of 91° C. and is found to have carbon, hydrogen, chlorine nitrogen and sulfur contents of 40.60, 2.80, 40.38, 8.10 and 8.95 percent, respectively, as compared with the theoretical contents of 40.75, 2.28, 40.0, 7.92 and 9.05 percent, respectively, calculated for the named structure.

EXAMPLE 8

3,5,6-trichloro-4-(methylsulfinyl)-2-cyanopyridine

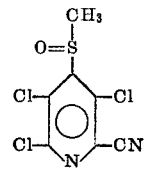

To a flask containing 50 milliliters of concentrated nitric acid at room temperature is added portionwise, with stirring, 10 grams (0.04 mole) of 3,5,6-trichloro-4-(methylthio)-2-cyanopyridine. The temperature of the mixture is quickly raised to 85° C. The mixture is held at 85° C. for 6 minutes and then quickly cooled and poured into ice water, stirred and the resulting solid precipitate of 3,5,6 - trichloro-4-(methylsulfinyl)-2-cyanopyridine-product is removed by filtration and dried. The product is recovered in a yield of 5.87 grams and has a melting point of 124° C.

EXAMPLE 9

2,5,6-trichloro-4-(methylsulfinyl)-3-cyanopyridine

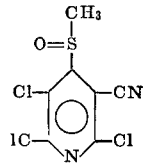

To an agitated solution containing 7.36 grams (0.03 mole) of 2,5,6-trichloro-4-(methylthio)-3-cyanopyridine, 20 milliliters of acetic acid and 20 milliliters of acetic anhydride at room temperature is added dropwise. 13.12 grams of 30 percent hydrogen peroxide. The mixture is stirred until the temperature exothermically rises to 60° C. The temperature is then raised to the reflux temperature of the mixture (105° C.) and refluxed for one half hour. Additional hydrogen peroxide is added in the amount of 20 milliliters and the mixture is allowed to stand at room temperature for about 12 hours after which, the mixture is refluxed an additional one half hour. An additional 10 milliliters of hydrogen peroxide is added and the mixture is refluxed an additional one half hour. The reaction mixture is poured into ice water and the white solid 2,5,6-trichloro-4-(methylsulfinyl)-3-cyanopyridine product precipitates and is filtered off. The solid material is mixed with a hexane-methylene dichloride solvent mixture, heated and filtered to remove some undissolved product. The remaining liquid is cooled and filtered to recover additional product. The product is recovered in a total yield of 5.5 grams and has a melting point of 179° C.

EXAMPLE 10

3,5,6-trichloro-4-(methylsulfonyl)-2-cyanopyridine

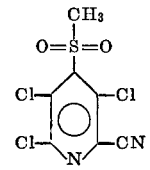

To an agitated solution containing 4.7 grams (0.02 mole) of 3,5,6-trichloro-4-(methylthio)-2-cyanopyridine (prepared by the method of Example 1) in 10 milliliters of acetic acid and 10 milliliters of acetic anhydride, is added slowly 0.84 gram of 30 percent hydrogen peroxide. The temperature is allowed to rise to 70° C., exothermically, and the reaction mixture is refluxed at 105° C. for 27 minutes. An additional 4.2 grams of hydrogen peroxide is added after the first 20 minutes of reflux has occurred. The reaction mixture is poured over ice and filtered to recover the precipitated 3,5,6 - trichloro - 4-(methylsulfonyl)-2-cyanopyridine product. The product is obtained in a yield of 57.4 percent, has a melting point of 138.5° C. and is found by analysis to have carbon, hydrogen, chlorine, nitrogen, sulfur and oxygen contents of 29.56, 0.82, 37.12, 10.01, 11.08 and 10.41 percent, respectively, as compared with the theoretical contents of 29.45, 1.05, 37.20, 9.83, 11.24 and 11.23 percent, respectively, calculated for the named structure.

EXAMPLE 11

3,5,6-tribromo-4-(methylsulfonyl)-2-cyanopyridine

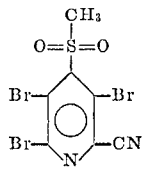

To a solution containing 7.6 grams (0.02 mole) of 3,5,6-tribromo-4-(methylthio)-2-cyanopyridine, 30 milliliters of acetic acid and 15 milliliters of acetic anhydride at room temperature is added slowly 8.9 grams of 30 percent hydrogen peroxide with stirring. The temperature is allowed to rise exothermically to 45° C. and the temperature is raised to the reflux temperature of the mixture and the mixture refluxed for 50 minutes. The reaction mixture is cooled and poured into ice water. To the quenched mixture is added 5 milliliters of a concentrated solution of sodium sulfate in water to precipitate the 3,5,6 - tribromo-4-(methylsulfonyl)-2-cyanopyridine product. The product is filtered and dried in benzene with anhydrous sodium sulfate. The benzene is removed and the resultant oil crystallized from cold methanol and filtered to recover the solid. The product was obtained in a yield of 3.31 grams, having a melting point of 148° C. and was found by analysis to have carbon, hydrogen, bromine, nitrogen, sulfur and oxygen contents of 20.39, 0.75, 56.98, 6.84, 7.52 and 7.52 percent, respectively, as compared with the theoretical contents of 20.08, 0.72, 5724, 6.69, 7.62 and 7.65 percent, respectively, calculated for the named structure.

EXAMPLE 12

3,5,6-trichloro-4-(decylsulfonyl)-2-cyanopyridine

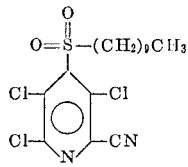

To an agitated 100 milliliter solution of acetic acid at room temperature is slowly added, 12.0 grams of 30 percent hydrogen peroxide and 10 grams (0.03 mole) of 3,5,6 - trichloro - 4 - (decylthio)-2-cyanopyridine. After the additions are complete, the mixture is stirred, at room temperature, for one hour and then refluxed at 109° C. for two hours. The reaction mixture temperature is reduced to 70° C. and an additional 10 grams of hydrogen peroxide are added. The mixture is allowed to stand for about 12 hours. The mixture is refluxed at about 109° C. for 10 minutes, cooled and poured into ice water. Saturated aqueous sodium sulfate is slowly added until precipitation is complete. The solid 3,5,6-trichloro-4-(decylsulfonyl)-2-cyanopyridine product is recovered by filtration and dried in benzene with sodium sulfate. The benzene is then removed and the residual material contacted with hexane. The solid product is crystallized from methanol and dried. The product has a melting point of 67.5° C. and is found by analysis to have carbon, hydrogen, chlorine, nitrogen, sulfur and oxygen contents of 47.23, 5.01, 25.64, 7.51, 7.66 and 6.95 percent, respectively, as compared with the theoretical contents of 46.60, 5.13, 25.90, 6.81, 7.80 and 7.76 percent, respectively, calculated for the named structure.

EXAMPLE 13

2,5-dichloro-4,6-bis[(p-chlorophenyl)sulfonyl]-3-cyanopyridine

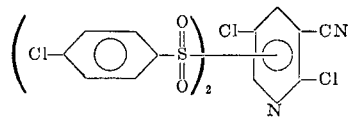

To an agitated solution containing 7.56 grams (0.02 mole) of 2,5 - dichloro - 4,6 - bis[(p-chlorophenyl)thio]-3-cyanopyridine, 30 milliliters of acetic acid and 15 milliliters of acetic anhydride at room temperature is added 9.75 grams of 30 percent hydrogen peroxide. The temperature is allowed to exothermically rise to 35° C. and the mixture heated at its reflux temperature for one half hour. An additional 80 milliliters of acetic acid and 15 milliliters of acetic anhydride are added followed by an additional 6 milliliters of hydrogen peroxide. The mixture is refluxed for one half hour, cooled and added to ice water and the solid 2,5-dichloro-4,6-bis[(p-chlorophenyl)sulfonyl]-3-cyanopyridine product is recovered by filtration and dried. The product is recovered in a yield of 4.2 grams having a melting point of 227° C. and is found by analysis to have carbon, hydrogen, chlorine, nitrogen and sulfur contents of 41.90, 1.60, 27.12, 5.70, 12.14 and 11.54 percent, respectively, as compared with the theoretical contents of 41.40, 1.50, 27.18, 5.37, 12.28 and 12.27 percent, respectively, calculated for the above named structure.

EXAMPLE 14

3,5,6-trichloro-4-(methylthio)-2-carboxypyridine

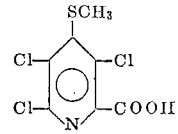

A solution is prepared by dissolving .874 gram (0.02 mole) of sodium chips in 50 milliliters of methanol. The solution is cooled to 0° C. and 2.2 grams (0.02 mole) of methyl mercaptan is added with agitation. This solution is added slowly to a refluxing solution of 5.0 grams (0.01 mole) of tetrachloropicolinic acid in 25 milliliters of methanol and refluxed at 60° C. for 3 hours. To this reaction mixture is added 50 milliliters of water to dissolve the precipitated sodium chloride and the mixture carefully acidified with hydrochloric acid until the solid crude 3,5,6 - trichloro - 4 - methylthio-2-carboxypyridine product is completely precipitated. The solid is dried by aspiration and taken up in benzene and dried with sodium sulfate. The benzene is partially removed and the product recrystallized from a benzene-hexane mixture. The 3,5,6-trichloro - 4 - (methylthio) - 2 - carboxypyridine product has a melting point of 119° C., is recovered in a yield of 99.8 percent of theoretical (5.16 grams) and is found to have carbon, hydrogen, chlorine, nitrogen, oxygen and sulfur contents of 31.02, 1.44, 39.28, 4.93, 11.77 and 11.56 percent, respectively, as compared with the theoretical contents of 30.85, 1.46, 39.05, 5.14, 11.74 and 11.76 percent, respectively, calculated for the named structure.

The following compounds of the present invention are prepared in accordance with the methods herein set forth. (M.P., B.P. and M.W. designated melting point, normal boiling point and molecular weight, respectively.)

2,5,6-trichloro-3-(methylthio)-4-cyanopyridine, M.W. 253.52

3,5,6-trichloro-4-(methylthio)-2-cyanopyridine, M.P. 58° C.
3,4,5-trichloro-6-(methylsulfonyl)-2-cyanopyridine, M.P. 157.5° C.
3,5,6-trifluoro-4-(methylsulfonyl)-2-cyanopyridine, M.P. 75°–77° C.
3,5,6-tribromo-4-(methylthio)-2-cyanopyridine, B.P. 112° C.
3,5,6-trichloro-4-(propylsulfonyl)-2-cyanopyridine, M.P. 166° C.
3,5,6-trichloro-4-(propylthio)-2-cyanopyridine, M.W. 281.54
3,5,6-trichloro-4-[(o-chlorocyclohexyl)sulfonyl]-2-cyanopyridine, M.P. 189–190° C.
3,5-dichloro-4,6-bis(methylthio)-2-cyanopyridine, M.P. 57° C.
2,3,5-trichloro-6-(propylsulfonyl)-4-cyanopyridine, M.P. 137° C.
3,5,6-trichloro-4-mercapto-2-carbamoylpyridine, M.P. 182° C.
3,5,6-trichloro-4-mercapto-2-carboxypyridine, M.P. 186° C.
3,5-dichloro-4-(methylthio)-2,6-dicyanopyridine, M.P. 63°–66° C.
3,4-dichloro-5-(methylthio)-2,6-dicyanopyridine, M.P. 63°–66° C.
3,6-dichloro-5-(propylthio)-2,4-dicyanopyridine, M.P. 48°–50° C.
3,5,6-trichloro-4-(methylsulfonyl)-2-carboxypyridine, M.W. 306.52
3,5,6-trichloro-2-(methylsulfonyl)-4-carbamoylpyridine, M.P. 211.5° C.
2,5,6-trichloro-3-(methylsulfinyl)-4-carboxypyridine-sodium salt. M.W. 308.50
3,5,6-trichloro-2-(methylsulfonyl)-4-carboxypyridine, M.P. 196° C.
2,5,6-trichloro-3-(methylsulfinyl)-4-carboxypyridine, M.P. 206°–209° C.
3,5,6-trichloro-4-(methylsulfinyl)-4-cyanopyridine, M.W. 379.61, 90.5 percent yield
3,5,6-trichloro-2-(methylsulfinyl)-4-carboxypyridine-chromium salt, M.W. 355.52
2,5,6-trichloro-4-(methylsulfinyl)-3-cyanopyridine, M.P. 179° C.
2,3,6-trichloro-5-(propylsulfonyl)-4-cyanopyridine, M.P. 110°–112° C.
3,5-difluoro-4,6-bis(propylthio)-2-cyanopyridine, M.W. 288.37
3,5-difluoro-4,6-bis(propylsulfonyl)-2-cyanopyridine, M.P. 183°–186° C.
2,4,6-trichloro-5-(methylthio)-3-cyanopyridine, M.W. 253.52
2,5,6-trichloro-4-(vinylthio)-3-cyanopyridine, M.W. 265.53
2,5,6-trichloro-4-(methylthio)-3-cyanopyridine, M.W. 253.52
3,5-dichloro-4-(propylthio)-6-(ethylthio)-2-cyanopyridine, M.W. 307.17
2,4,6-trichloro-5-(methylsulfonyl)-3-cyanopyridine, M.W. 285.54
2,5,6-trichloro-4-(methylsulfonyl)-3-cyanopyridine, M.W. 285.54
2,5,6-trichloro-4-(phenethylthio)-3-carboxypyridine, M.W. 362.48
2,5,6-trichloro-4-[(p-chlorophenyl)thio]-3-cyanopyridine, M.W. 350.03
2,4,6-trichloro-5-[(p-chlorophenyl)thio]-3-cyanopyridine, M.W. 350.03
2,5-dichloro-4,6-bis(p-chlorophenyl)thio]-3-cyanopyridine, M.W. 458.16
3,5,6-trichloro-4-mercapto-2-carboxypyridine-calcium salt, M.W. 296.59
3,5,6-tribromo-4-(3-ethylphenylsulfonyl)-2-carboxypyridine, M.W. 527.86

3,4,5-trichloro-6-(phenylpropylthio)-2-carbamoxypyridine M.W. 359.59
3,4,5-trichloro-6-(methylthio)-2-cyanopyridine, M.W. 253.52
2,5,6-trichloro-3-(methylsulfonyl)-4-cyanopyridine, M.P. 145°–150° C.
2,5,6-trichloro-3-(benzylsulfinyl)-4-cyanopyridine, M.W. 325.57
2,5,6-trichloro-3-(propylsulfonyl)-4-cyanopyridine, M.W. 313,59
3-bromo-5,6-dichloro-2-(ethylsulfonyl)-4-carboxypyridine, M.W. 363.09
2,6-dichloro-5-bromo-3-(methylthio)-4-cyanopyridine, M.W. 297.98
3-chloro-5-bromo-4-(methylsulfinyl)-2,6-dicyanopyridine, M.W. 304.53
2,3,5-trichloro-6-(methylsulfonyl)-4-cyanopyridine, M.P. 237° C.
2,5-dichloro-3-(benzylsulfinyl)-6-(propylsulfinyl)-4-cyanopyridine, M.W. 369.14
3,5-dichloro-4-(methylsulfonyl)-2,6-dicarboxylpyridine, M.W. 314.07
3,5-dichloro-5-(methylsulfonyl)-2,4-dicarbamoylpyridine, M.W. 312.07
3,5,6-trichloro-2-(propylthio)-4-cyanopyridine, M.W. 281.54
3,5-dichloro-6-(methylsulfonyl)-2,4-dicyanopyridine, M.W. 276.07
3,6-dichloro-5-(methylsulfonyl)-2,4-dicyanopyridine, M.P. 208°–214° C.
3,5,6-trichloro-4-(dodecylsulfonyl)-2-cyanopyridine, M.W. 439.63
2,3,6-trichloro-5-mercapto-4-cyanopyridine, M.P. 100° C.
2,3,6-trichloro-5-(3-propylphenylthio)-4-cyanopyridine, M.W. 357.59.

In accordance with the present invention, it has been discovered that the mono-, bis- or tristhio-, sulfinyl and sulfonyl pyridine compounds can be employed as pesticides for the control of many bacterial, fungal and insect pests. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also the compounds can be distributed in textiles or cellulosic materials to preserve and protect such products from the attack of the organisms of rot, mold and decay. They also can be employed as a toxicant to control insect pests.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium or when employed to contact insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to apply the compounds as wettable powders.

In a representative operation, each of the compounds 2,3,5-trichloro-6-(methylsulfonyl)-4-cyanopyridine,
3,5,6-trichloro-4-(methylsulfonyl)-2-cyanopyridine,
2,3,5-trichloro-6-(propylsulfonyl)-4-cyanopyridine,
3,5-difluoro-4,6-bis(propylsulfonyl)-2-cyanopyridine,
3,5,6-trifluoro-4-(methylsulfonyl)-2-cyanopyridine,
2,5,6-trichloro-4-(methylsulfinyl)-3-cyanopyridine, 3,5,6-trifluoro-4-(methylthio)-2-cyanopyridine,
2,3,6-trichloro-5-(propylsulfonyl)-4-cyanopyridine,
3,5,6-trichloro-4-(decylsulfonyl)-2-cyanopyridine,
3,5,6-trichloro-4-(propylsulfonyl)-2-cyanopyridine and
3,5,6-trichloro-4-mercapto-2-cyanopyridine when employed as the sole toxicant in a nutrient agar at a concentration of about 500 parts by weight of the compound per million parts of agar is found to give 100 percent kill and control of the organisms *Staphylococcus aureus* and *Bacillus subtilis*.

In another representative operation, employing the same nutrient agar and toxicant concentration, 3,5,6-trichloro-4-mercapto - 2 - carboxypyridine and 3,5,6-trichloro-4-(methylthio-3)-2-carboxypyridine are found to give 100 percent kill and control of the organism *Bacillus subtilis* and *Salmonella typhosa;* 3,5,6 - trichloro-4-mercapto-2-carbamoylpyridine is found to give 100 percent kill and control of *Bacillus subtilis* and *Mycobacterium phlei* and 3,5,6-trichloro-4-(methylsulfonyl) - 2 - carboxypyridine and 3,5-dichloro-4,6-bis(methylthio)-2-cyanopyridine are found to give 100 percent kill and control of *Trichophyton mentagrophytes*.

In additional operations employing the same toxicant concentration and nutrient agar, each of the compounds 2,3,5-trichloro-6-(methylsulfonyl)-4-cyanopyridine,
2,5,6-trichloro-4-(methylsulfinyl)-3-cyanopyridine,
3,5,6-trichloro-4-(methylsulfonyl)-2-cyanopyridine,
2,3,4-trichloro-6-(propylsulfonyl)-4-cyanopyridine,
3,5,6-trifluoro-4-(methylthio)-2-cyanopyridine,
2,3,6-trichloro-5-(propylsulfonyl)-4-cyanopyridine,
3,5,6-trichloro-4-(propylsulfonyl)-2-cyanopyridine,
3,5,6-tribromo-4-(methylthio)-2-cyanopyridine and
3,5,6-trichloro-4-mercapto-2-cyanopyridine give 100 percent kill and control of the organisms *Candida albicans, Candida pelliculosa, Pullularia pullulans* and *Aspergillus terreus*.

In another representative operation employing the same toxicant concentrations and agar, each of the compounds 2,3,5-trichloro-6-(methylsulfonyl)-4-cyanopyridine,
2,5,6-trichloro-4-(methylsulfinyl)-3-cyanopyridine,
3,5,6-trichloro-4-(methylsulfonyl)-2-cyanopyridine,
2,3,5-trichloro-6-(propylsulfonyl)-4-cyanopyridine,
3,5,6-trifluoro-4-(methylthio)-2-cyanopyridine,
2,3,6-trichloro-5-(propylsulfonyl)-4-cyanopyridine and
3,5,6 - trichloro-4-(propylsulfonyl)-2-cyanopyridine give 100 percent kill and control of the organisms *Rhizopus nigricans, Mycobacterium phlei* and *Trichophyton mentagrophytes*.

In an additional operation employing the same toxicant concentration and nutrient agar, 2,5,6-trichloro-3-(methylsulfinyl)-4-carboxypyridine is found to give 100 percent kill and control of the organisms *Candida albicans, Trichophyton mentagrophytes* and *Mycobacterium phlei*; 2,5,6-trichloro-4-(methylsulfinyl) - 3 - cyanopyridine is found to give 100 percent kill and control of *Psuedomonas aeruginosa, Escherichia coli, Aerobacter aerogenes* and *Salmonella typhosa;* 3,5,6-trichloro - 4 - (propylthio)-2-cyanopyridine gives 100 percent kill and control of *Trichophyton mentagrophytes, Pullularia pullulans* and *Mycobacterium phlei*; each of 3,5,6-trichloro-4-(decylsulfonyl)-2-cyanopyridine and 3,5,6-tribromo-4-(methylthio)-2-cyanopyridine is found to give 100 percent kill and control of *Cephaloascus fragans, Trichophyton mentagrophytes* and *Mycobacterium phlei* and 3,5-dichloro-4,6-bis(methylthio) is found to give 100 percent kill and control of *Rhizopus nigricans*.

In other representative operations, 2,3,5-trichloro-6-(methylsulfonyl)-4-cyanopyridine,
3,5-difluoro-4,6-bis(propylthio)-2-cyanopyridine,
3,5,6-trifluoro-4-(methylthio)-2-cyanopyridine and
3,5,6 - trichloro-4-(propylsulfonyl)-2-cyanopyridine each when employed as the sole toxic constituent in liquid compositions in amounts of 5 parts per million of the ultimate composition, give 100 percent kill and control of yellow fever mosquito larvae.

In other operations, 3,5,6-trifluoro-4-(methylthio)-2-cyanopyridine,
2,3,5-trichloro-6-(propylsulfonyl)-4-cyanopyridine,
3,5,6-trichloro-4-(methylsulfonyl)-2-cyanopyridine,
3,5,6-trichloro-4-(propylthio)-2-cyanopyridine and
2,3,5 - trichloro-6-(methylsulfonyl)-4-cyanopyridine each when employed as the sole toxic constituent in a nutrient solution in amounts of at least 10 parts per million of the ultimate composition, give substantially complete kill and control of *Chlorella algae*.

In other operations, aqueous compositions containing 3,5,6-trichloro-4-mercapto-2-cyanopyridine as the sole toxicant at a concentration of 500 parts per million give complete kills of the common housefly; aqueous compositions containing 3,5,6-trifluoro-4-(methylthio)-2-cyanopyridine as the sole toxicant at a concentration of 300 parts per million by weight give complete kills of Round worm larvae and aqueous compositions containing 3,5,6-trichloro-4-(methylsulfonyl)-2-carboxypyridine as the sole toxicant at a concentration of 500 parts per million by weight give substantial kill and control of American cockroach.

In another operation, aqueous compositions containing one of 2,3,5-trichloro-6-(methylsulfonyl)-4-cyanopyridine,
3,5,6-trichloro-4-(methylsulfonyl)-2-cyanopyridine,
2,5,6-trichloro-4-(methylsulfinyl)-3-cyanopyridine,
3,5,6-trifluoro-4-(methylthio)-2-cyanopyridine and
3,5,6-trichloro-4-(propylsulfonyl)-2-cyanopyridine as the sole toxicant give substantially complete kills of Elodea, Cabomba and Moneywort when employed at a concentration of 10 parts per million by weight of the ultimate composition.

In another representative operation, 2,3,5-trichloro-6-(methylsulfonyl)-4-cyanopyridine when dispersed in a commercial latex paint composition as the sole toxicant and in an amount of 1.0 percent by weight of the ultimate paint composition and the paint applied to wood panels which are dried and thereafter exposed for two months in a tropical chamber at a relative humidity of 95 percent and a temperature of 82° F. completely prevented any mold or mildew growth.

PREPARATION OF STARTING MATERIALS

The polyhalo-, mono- and dicyanopyridines employed as starting materials can be prepared by the method of U.S. Pat. 3,325,503 wherein cyano-substituted pyridines are chlorinated with chlorine gas in vapor phase operations employing a carbon catalyst activated with barium chloride at a temperature of about 300°–400° C. The polyhalo-, mono- or dicyanopyridine may then be converted to the bromo or fluoro or partial bromo or fluoro cyanopyridine counterparts employing known techniques of halide exchange, wherein the above-identified tetrachlorocyanopyridines and trichlorodicyanopyridines are treated with gaseous hydrogen bromide in an acid medium or potassium fluoride in a polar solvent and conveniently at the boiling temperature and under reflux.

Following the exchange, the desired product is separated by conventional procedures such as washing with water, extraction and fractional distillation.

The cyano-substituted pyridines employed to prepare the polyhalo-, mono- or dicyanopyridines are commercially available and may be prepared by the ammoxidation of methylpyridine as described in Chemical Engineering Progress, September 1964, pp. 48–49.

The polyhalo- mono- and dicarbamoyl- or carboxypyridines starting materials can be prepared by conventionally controlled hydrolysis of the appropriate polyhalomono- or dicyanopyridines with either an acid or base or with alkaline hydrogen peroxide.

What is claimed is:
1. A compound corresponding to the formula

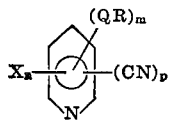

wherein R represents hydrogen, alkyl of 1 to 12 carbon atoms, mono(chloro-, fluoro- or bromo-)alkyl of 1 to 12 carbon atoms, alkenyl of 2 to 10 carbon atoms, mono-(chloro-, fluoro- or bromo-)alkenyl of 2 to 10 carbon atoms, cycloalkyl of 3 to 6 carbon atoms, mono(chloro-, fluoro- or bromo-)cycloalkyl of 3 to 6 carbon atoms, phenyl, aralkyl of 7 to 9 carbon atoms, alkaryl of 7 to 9 carbon atoms or mono(chloro-, fluoro- or bromo-)phenyl; Q represents sulfide (—S—), sulfinyl

or sulfonyl

each X independently represents chlorine, bromine or fluorine; $n$ represents an integer of 0 to 3, inclusive; $m$ represents an integer of 1 to 3, inclusive, $p$ represents an integer of 1 and the sum of $n+m+p$ equals an integer of 2 to 5, inclusive, with the provisos that when Q is other than sulfide (—S—), R is other than hydrogen and when R is hydrogen, $m$ is not greater than 2.

2. The compound of claim 1 wherein X is chlorine and Q is sulfonyl.
3. The compound of claim 1 wherein R is alkyl, X is chlorine.
4. The compound of claim 2 wherein R is alkyl.
5. The compound of claim 1 wherein R is alkyl, X is chlorine and Q is sulfide.
6. The compound of claim 1 having the formula

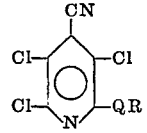

7. The compound of claim 4 wherein R is methyl.

References Cited
UNITED STATES PATENTS
3,519,634  7/1970  Mohr et al. _____ 260—294.8 G ALAN L. ROTMAN, Primary Examiner U.S. Cl. X.R.

27—11; 117—138.5; 252—380; 260—294.8 G; 270 R; 424—263, 66.